US012533270B2

(12) United States Patent
Van Loon

(10) Patent No.: US 12,533,270 B2
(45) Date of Patent: Jan. 27, 2026

(54) PATIENT TRANSPORT APPARATUS WITH STEER LOCK ASSEMBLY

(71) Applicant: Stryker Corporation, Kalamazoo, MI (US)

(72) Inventor: Mackenzie Van Loon, Mattawan, MI (US)

(73) Assignee: Stryker Corporation, Portage, MI (US)

( * ) Notice: Subject to any disclaimer, the term of this patent is extended or adjusted under 35 U.S.C. 154(b) by 153 days.

(21) Appl. No.: 18/383,944

(22) Filed: Oct. 26, 2023

(65) Prior Publication Data

US 2024/0130906 A1 Apr. 25, 2024
US 2024/0225926 A9 Jul. 11, 2024

Related U.S. Application Data

(63) Continuation of application No. 17/720,694, filed on Apr. 14, 2022, now Pat. No. 11,833,085, which is a continuation of application No. 16/690,232, filed on Nov. 21, 2019, now Pat. No. 11,324,648.

(60) Provisional application No. 62/770,316, filed on Nov. 21, 2018.

(51) Int. Cl.
*A47G 1/00* (2006.01)
*A61G 1/02* (2006.01)

(52) U.S. Cl.
CPC ......... *A61G 1/0243* (2013.01); *A61G 1/0287* (2013.01)

(58) Field of Classification Search
CPC .......... A61G 1/00; A61G 1/02; A61G 1/0243; A61G 1/0287
See application file for complete search history.

(56) References Cited

U.S. PATENT DOCUMENTS

| | | | |
|---|---|---|---|
| 2,583,858 | A | 1/1952 | Kostolecki |
| 4,128,144 | A | 12/1978 | Vassar |
| 4,349,938 | A | 9/1982 | Fontana |

(Continued)

FOREIGN PATENT DOCUMENTS

| | | | |
|---|---|---|---|
| CA | 2669506 | C | 10/2014 |
| DE | 10229929 | A1 | 1/2004 |
| DE | 102007039208 | A1 | 5/2008 |

OTHER PUBLICATIONS

English language abstract and machine-assisted English translation for DE 102 29 929 extracted from espacenet.com database on Jan. 27, 2020, 11 pages.

*Primary Examiner* — Fredrick C Conley
(74) *Attorney, Agent, or Firm* — Howard & Howard Attorneys PLLC

(57) ABSTRACT

A patient transport apparatus comprises a support structure comprising base, a frame, and a patient support surface to support a patient. The apparatus also includes at least one caster assembly coupled to the support structure, with each one of the caster assemblies comprising a wheel, a wheel support coupled to the wheel, and a steer lock assembly movable relative to the wheel support. An actuator is operatively coupled to the steer lock assembly to move the steer lock assembly between a non-steer locked and steer locked state to permit or prevent the wheel support and coupled wheel from swiveling about a swivel axis. The caster assemblies can also include a brake assembly coupled to the wheel, with the actuator operatively coupled to the brake assembly to move the brake assembly between a braked and unbraked state.

19 Claims, 5 Drawing Sheets

(56) References Cited

U.S. PATENT DOCUMENTS

| | | | | |
|---|---|---|---|---|
| 4,489,449 | A | 12/1984 | Failor et al. | |
| 5,377,372 | A | 1/1995 | Rudolf et al. | |
| 5,450,650 | A | 9/1995 | Bertrand et al. | |
| 6,321,878 | B1 * | 11/2001 | Mobley | B60B 33/0057 188/1.12 |
| 6,330,926 | B1 | 12/2001 | Heimbrock et al. | |
| 7,546,908 | B2 | 6/2009 | Chang | |
| 7,810,822 | B2 | 10/2010 | Figel et al. | |
| 8,776,314 | B2 | 7/2014 | Hofrichter et al. | |
| 8,789,662 | B2 | 7/2014 | Childs et al. | |
| 9,266,393 | B2 * | 2/2016 | Yeo | B60B 33/025 |
| 9,862,229 | B2 | 1/2018 | Hofrichter et al. | |
| 10,806,653 | B2 * | 10/2020 | Upchurch | A61G 7/018 |
| 11,173,747 | B2 * | 11/2021 | Renno | B62B 9/082 |
| 11,324,648 | B2 | 5/2022 | Van Loon | |
| 2007/0216117 | A1 | 9/2007 | Figel et al. | |
| 2009/0165208 | A1 | 7/2009 | Reed et al. | |
| 2013/0111664 | A1 | 5/2013 | Childs et al. | |
| 2013/0174377 | A1 | 7/2013 | Lin et al. | |
| 2014/0102834 | A1 | 4/2014 | Spoor | |
| 2016/0089283 | A1 * | 3/2016 | DeLuca | A61G 7/08 180/413 |
| 2017/0100962 | A1 | 4/2017 | Kloss et al. | |
| 2017/0119607 | A1 * | 5/2017 | Derenne | B60B 33/0092 |
| 2019/0192364 | A1 | 6/2019 | Upchurch et al. | |
| 2020/0155382 | A1 | 5/2020 | Van Loon | |
| 2022/0233368 | A1 | 7/2022 | Van Loon | |

* cited by examiner

PATIENT TRANSPORT APPARATUS WITH STEER LOCK ASSEMBLY

CROSS-REFERENCE TO RELATED APPLICATIONS

The subject patent application is a Continuation of U.S. patent application Ser. No. 17/720,694 filed on Apr. 14, 2022, which is a Continuation of U.S. patent application Ser. No. 16/690,232 filed on Nov. 21, 2019 and issued as U.S. Pat. No. 11,324,648 on May 10, 2022, which claims priority to and all the benefits of U.S. Provisional Patent Application No. 62/770,316 filed on Nov. 21, 2018, the disclosures of each of which are hereby incorporated by reference in their entirety.

BACKGROUND

Patient transport apparatuses facilitate care of patients in a health care setting. Patient transport apparatuses comprise, for example, hospital beds, stretchers, cots, wheelchairs, and chairs. A conventional patient transport apparatus comprises a support structure having a base, a frame, and a patient support surface upon which the patient is supported. The patient transport apparatus may also comprise caster assemblies with caster wheels to facilitate movement of the patient transport apparatus. Often, one or more of the caster assemblies include a steer lock assembly to facilitate steering of the patient transport apparatus during movement. Sometimes, engagement of the steer lock assembly may be difficult.

A patient transport apparatus with steer lock assembly designed to overcome one or more of the aforementioned challenges is desired.

DETAILED DESCRIPTION OF THE EMBODIMENTS

Figure 1:
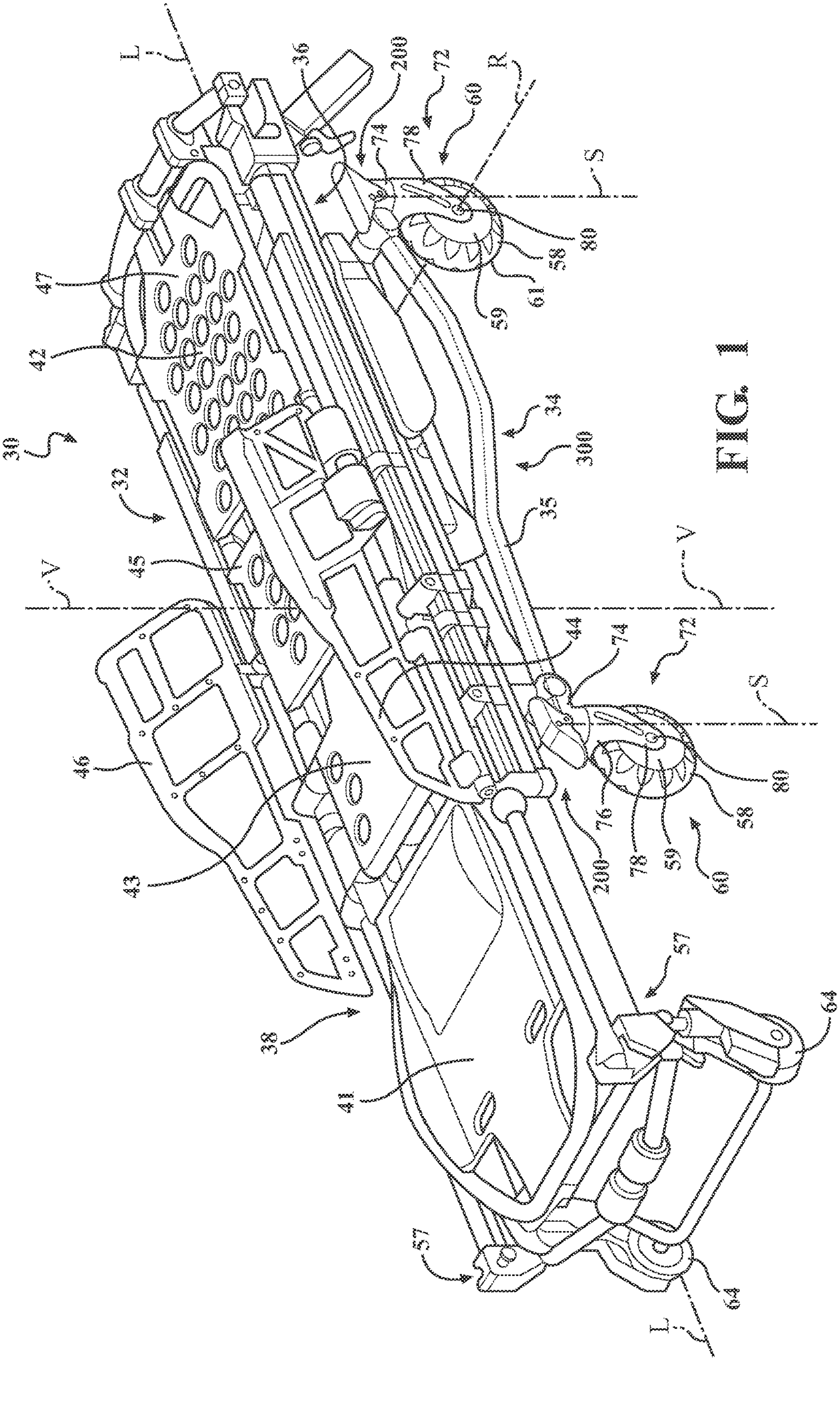
FIG. 1 is a perspective view of a patient transport apparatus with a plurality of caster assemblies.

Referring to FIG. 1, a patient transport apparatus 30 is shown for supporting a patient in a health care setting. The patient transport apparatus 30 may comprise a hospital bed, stretcher, cot, wheelchair, chair, or similar apparatus utilized in the care of a patient. In the embodiment shown in FIG. 1, the patient transport apparatus 30 comprises a cot that is utilized to transport patients, such as from an emergency site to an emergency vehicle (e.g., an ambulance).

The patient transport apparatus 30 shown in FIG. 1 comprises a support structure 32 that provides support for the patient. The support structure 32 comprises a base 34 and a support frame 36. The base 34 comprises a base frame 35. The support frame 36 is spaced above the base frame 35. The support structure 32 also comprises a patient support deck 38 disposed on the support frame 36. The patient support deck 38 comprises several sections, some of which are capable of articulating relative to the support frame 36, such as a back section 41, a seat section 43, a leg section 45, and a foot section 47. The patient support deck 38 provides a patient support surface 42 upon which the patient is supported.

The base 34, support frame 36, patient support deck 38, and patient support surface 42 each have a head end and a foot end corresponding to designated placement of the patient's head and feet on the patient transport apparatus 30. The support frame 36 comprises a longitudinal axis L along its length from the head end to the foot end. The support frame 36 also comprises a vertical axis V arranged crosswise (e.g., perpendicularly) to the longitudinal axis L along which the support frame 36 is lifted and lowered relative to the base 34. The construction of the support structure 32 may take on any known or conventional design, and is not limited to that specifically set forth above. In addition, a mattress (not shown) may be provided in certain embodiments, such that the patient rests directly on a patient support surface of the mattress while also being supported by the patient support surface 42.

Side rails 44, 46 are coupled to the support frame 36 and thereby supported by the base 34. A right side rail 44 is positioned at a right side of the support frame 36. A left side rail 46 is positioned at a left side of the support frame 36 (with the left side defined relative to a person positioned at the head end of the support frame 36 and facing the support frame 36). If the patient transport apparatus 30 is a hospital bed there may be more side rails. The side rails 44, 46 may be fixed to the support frame 36 or may be movable between a raised position in which they block ingress and egress into and out of the patient transport apparatus 30, one or more intermediate positions, and a lowered position in which they are not an obstacle to such ingress and egress. In still other configurations, the patient transport apparatus 30 may not include any side rails.

A pair of handle assemblies 57 may also be coupled to the support frame 36 at a position near the head end of the bed that may be raised for use in transporting the patient transport apparatus 30, particularly when the apparatus 30 is in the lowered position. The handle assemblies 57 may also be lowered to a stowed position when not in use.

Wheels 58 are coupled to the base 34 to facilitate transport over floor surfaces. The wheels 58 are arranged in each of four quadrants of the base 34 adjacent to corners of the base frame 35. In the embodiment shown, the wheels 58 are caster wheels able to rotate and swivel relative to the support structure 32 during transport. Each of the wheels 58 forms part of a caster assembly 60. Each caster assembly 60 is mounted to the base 34. It should be understood that various configurations of the caster assemblies 60 are contemplated. In addition, in some embodiments, the wheels 58 are not caster wheels and may be non-steerable, steerable, non-powered, powered, or combinations thereof. Additional wheels are also contemplated. For example, the patient transport apparatus 30 may comprise four non-powered, non-steerable wheels, along with one or more powered wheels.

In other embodiments, one or more auxiliary wheels (powered or non-powered), which are movable between stowed positions and deployed positions, may be coupled to the support structure 32. In some cases, when these auxiliary wheels are located between caster assemblies 60 and contact the floor surface in the deployed position, they cause two of the caster assemblies 60 to be lifted off the floor surface thereby shortening a wheel base of the patient transport apparatus 30. A fifth wheel may also be arranged substantially in a center of the base 34.

A pair of loading wheels 64 may be coupled to the support frame 36 to assist with loading of the patient transport apparatus 30 into the emergency vehicle and unloading of the patient transport apparatus 30 out of the emergency vehicle. In the embodiment shown, the loading wheels 64 are arranged nearer the head end than the foot end, but the loading wheels 64 may be placed in other locations to facilitate loading and/or unloading of the patient transport apparatus 30 into and out of the emergency vehicle, or for other purposes.

In one embodiment, each of the wheels 58 comprises a wheel hub 59 and an outer wheel portion 61 surrounding the wheel hub 59. The outer wheel portion 61 has an outer end surface 63 (see FIG. 2A), at least part of which is arranged to contact the floor surface F when rolling along the floor surface F.

Figure 2A:
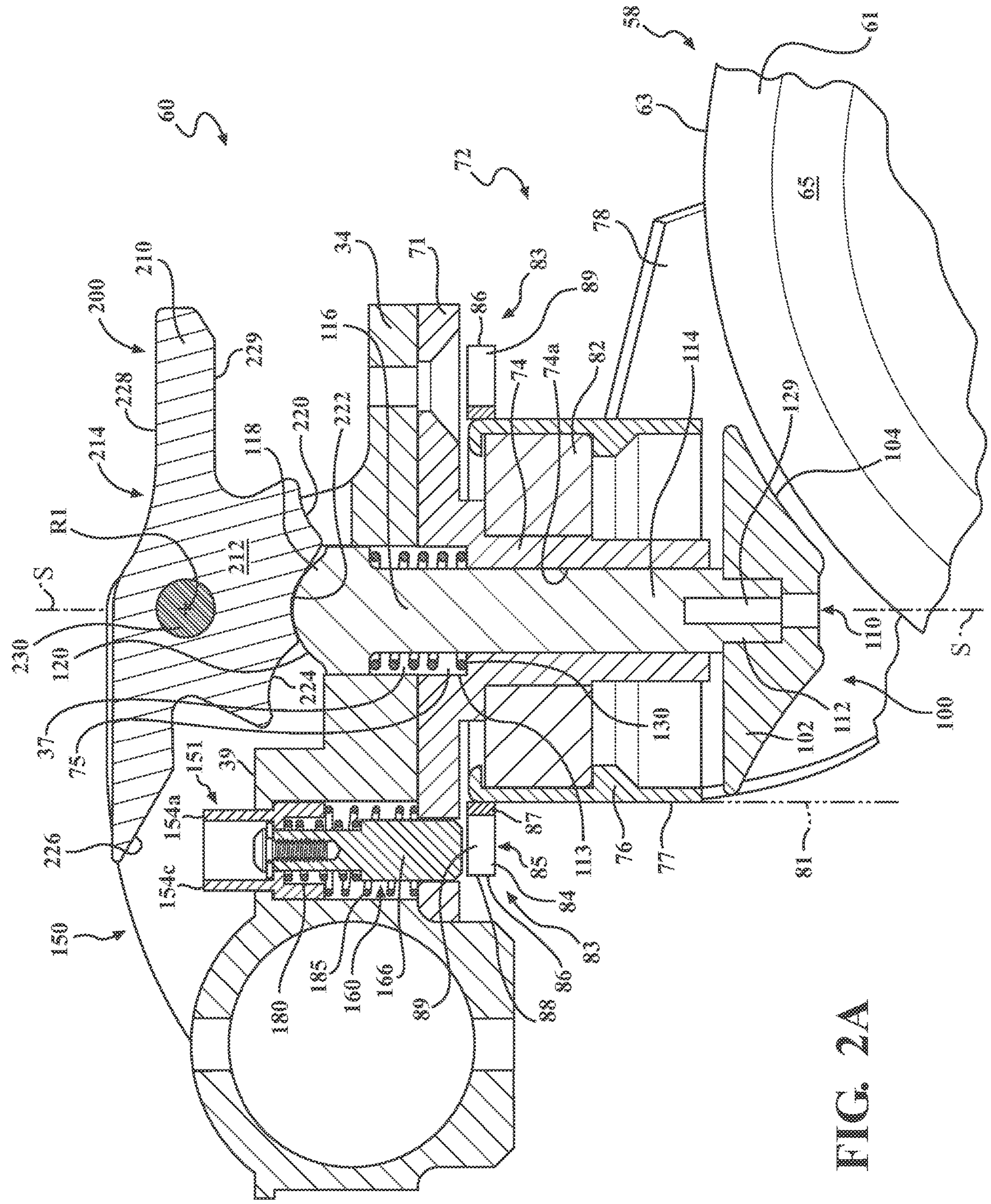
FIG. 2A is a cross-sectional view illustrating one of the caster assemblies in a neutral mode in which the steer lock assembly is in a non-steer locked state and the brake assembly is in an unbraked state.
Figure 2B:
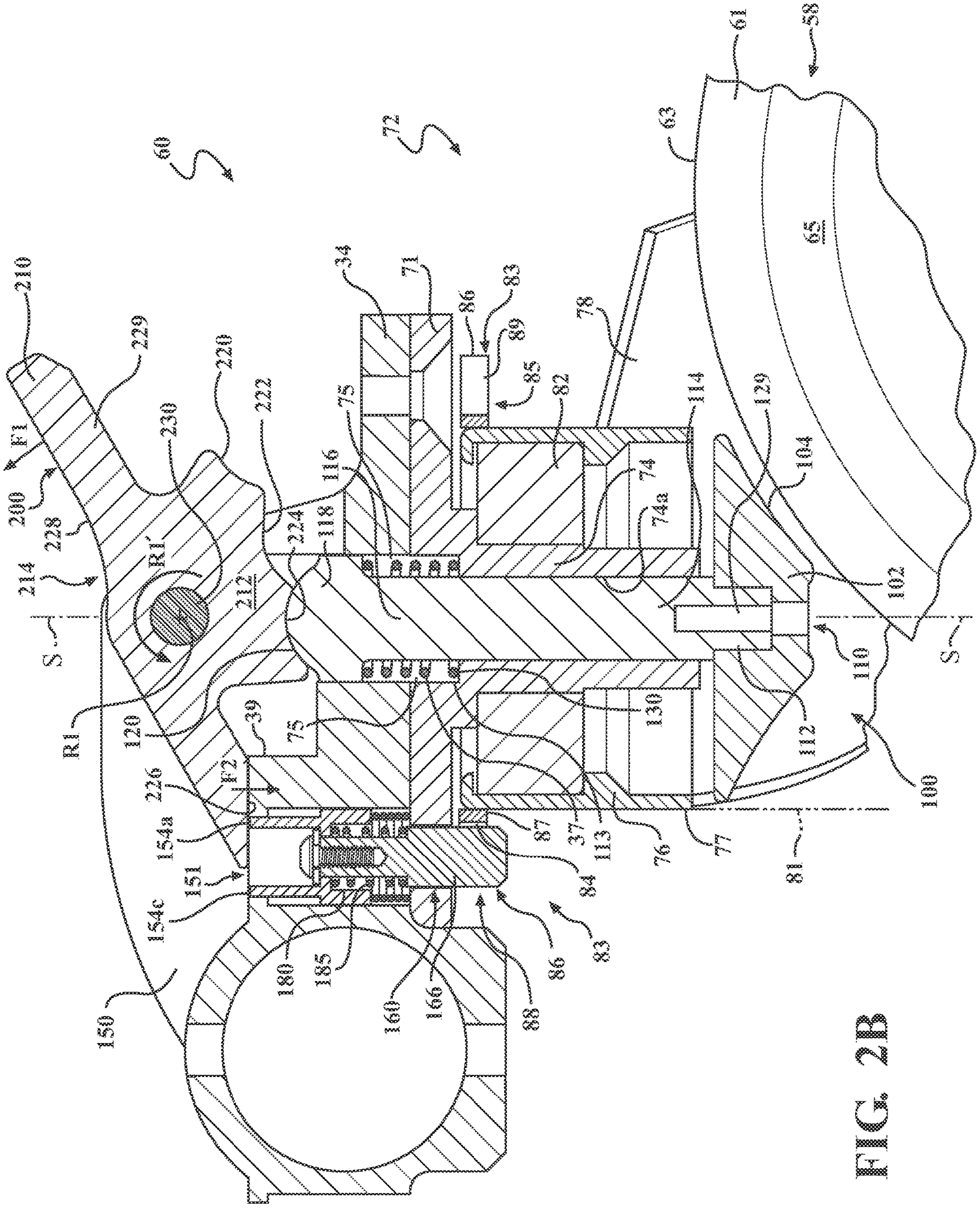
FIG. 2B is a cross-sectional view illustrating the caster assembly of FIG. 2A in a steer locked mode in which the steer lock assembly is in a steer locked state and the brake assembly is in the unbraked state.
Figure 2C:
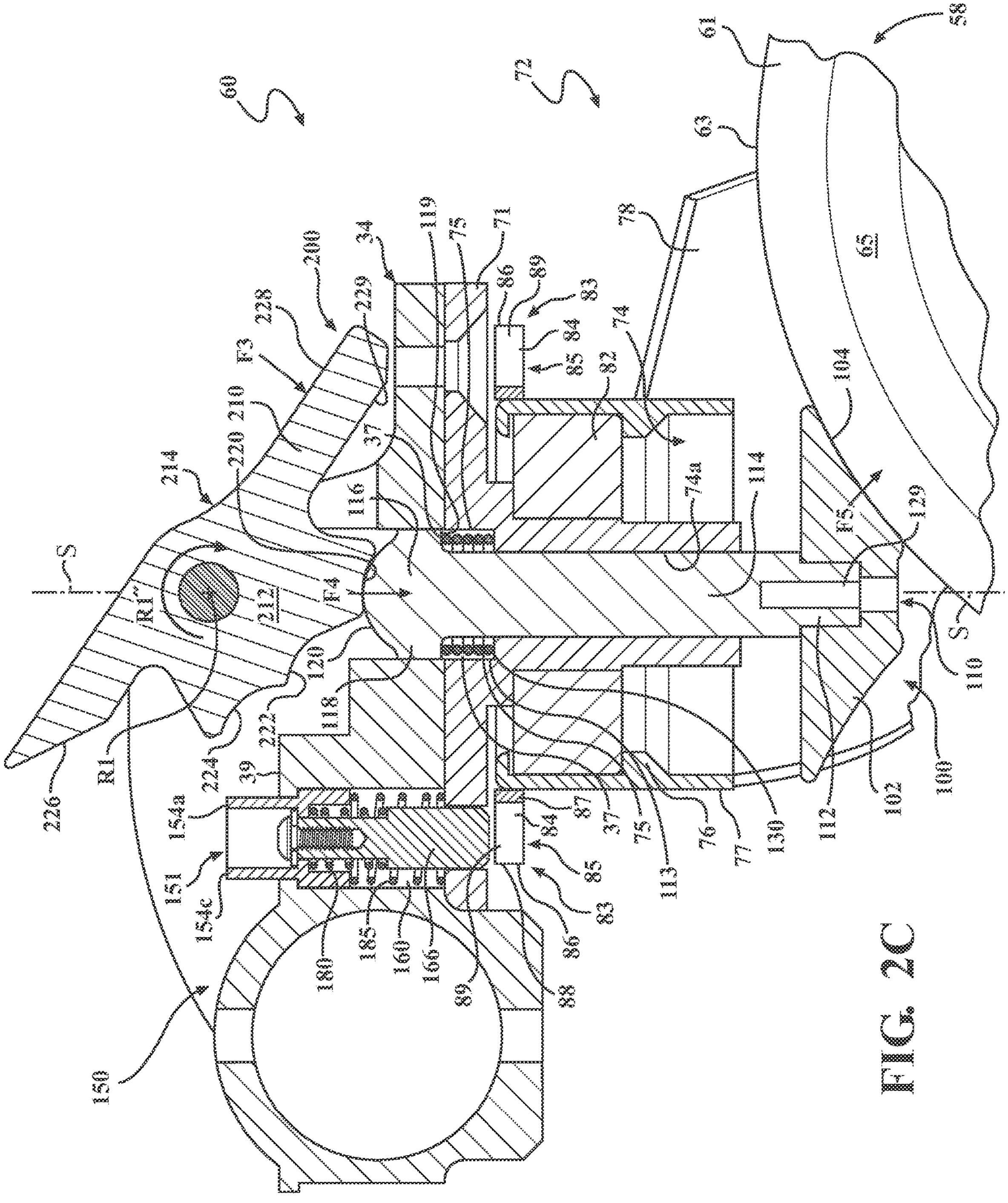
FIG. 2C is a cross-sectional view illustrating the caster assembly of FIG. 2A in a braked mode in which the steer lock assembly is in the non-steer locked state and the brake assembly is in the braked state.

Referring to FIGS. 1, 2A-2C and 4A-4B, the caster assembly 60 further comprises a wheel support 72 and a caster stem 74 (see FIGS. 2A-2C). The wheel support 72 is arranged to support the wheel 58 for rotation about a rotational axis R (see FIG. 1) and for swiveling about a swivel axis S, with the swivel axis S generally normal to the floor surface F and to the rotational axis R. The wheel support 72 may comprise various types of support structures. In the embodiment shown, the wheel support 72 comprises a fork 78 and a neck 76 fixed to the fork 78. The wheel 58 is secured to the fork 78 via an axle 80 (see FIG. 1) passing through the wheel hub 59. The axle 80 is attached to the fork 78. The wheel 58 is arranged to rotate about the rotational axis R defined by the axle 80. The wheel 58 may rotate relative to the axle 80 via a wheel bearing (not shown) or, in alternative embodiments, the wheel 58 may be fixed to the axle 80 to rotate with the axle 80 relative to the fork 78. Other configurations that allow the wheel 58 to rotate about the rotational axis R and roll along the floor surface F are contemplated.

As best shown in FIGS. 2A-2C, the stem 74 is fixed to the base 34 of the patient transport apparatus 30 such that the stem 74 is unable to swivel about the swivel axis S or otherwise move relative to the base frame 35 and the base 34. The stem 74 is hollow, and includes an interior surface 74A defining an interior space 75. The stem 74 can also define the swivel axis S (see FIGS. 1 and 2A-2C).

The neck 76 is coupled to the stem 74 via a bearing 82 so that the neck 76 is able to swivel relative to the stem 74 about the swivel axis S when the wheel 58 is changing orientation. An outer surface 77 of the neck 76 may generally define an outer tangential plane 81 that extends between the floor F and the base 34. Owing to the fixed connection between the neck 76 and the fork 78, the fork 78, neck 76 and wheel 58 are also able to swivel relative to the stem 74 about the swivel axis S. Fasteners, press-fit connections, welding, and/or other structures may be present to secure the stem 74 to the base 34, as is conventional in the art. The stem 74 may also be referred to as a kingpin, spindle, post, or the like. Additionally, a collar, sleeve, flange, or other suitable structure (referred to hereinafter as flange 71) may be fixed to the stem 74 (or may be integrally formed with the stem 74) and located between the stem 74 and the base 34 to further support the stem 74.

In certain embodiments, the stem 74, flange 71 and base 34 may be separate components that are fixed together or may be a single integrally formed component. In still further embodiments, the stem 74 and flange 71 may be integrally formed and separate from, but affixed to, the base 34, while in even further embodiments the flange 71 and base 34 are integrally formed and separate from, and affixed to, the stem 74. As illustrated in FIGS. 2A-2C, the flange 71 and the stem 74 are formed as a single piece, and the flange 71 is positioned adjacent to, and fixed to, a portion of the base 34.

In the embodiment shown, the neck 76 and fork 78 form one type of swivel assembly that provides a swivel joint for the caster assembly 60. Other swivel assemblies that allow the wheel 58 to swivel relative to the base 34 are also possible.

In certain embodiments, the one or more caster assemblies 60 include a steer lock assembly 150, which is respectively configured to facilitate preventing the caster assembly 60, and more specifically the wheel 58 of the caster assembly 60, from swiveling about the swivel axis S, with the steer lock assembly 150 being operable between a steer locked state and a non-steer locked state. In certain of these embodiments, one or more of the caster assemblies 60 also includes a brake assembly 100, which is respectively configured to facilitate braking of the wheel 58 about the rotational axis R, with the brake assembly 100 being operable between a braked state and an unbraked state.

FIGS. 2A-2C show these states of one of the steer lock assemblies 150 and brake assemblies 100, and these combinations of various states create modes of the patient transport apparatus 30. More specifically, FIG. 2A shows a neutral mode in which the steer lock assembly 150 is in the non-steer locked state and in which the brake assembly 100 is in an unbraked state. FIG. 2B shows a steer locked mode in which the steer lock assembly 150 is in the steer locked state and in which the brake assembly 100 is in an unbraked state. FIG. 2C shows a braked mode in which the steer lock assembly 150 is in the non-steer locked state and in which the brake assembly 100 is in a braked state.

The non-steer locked state, as shown in FIGS. 2A and 2C, refers to a positioning of the steer lock assembly 150 relative to the wheel 58 wherein the steer lock assembly 150 does not impede the rotation of the wheel 58 about its swivel axis S. Conversely, the steer locked state, as shown in FIG. 2B, places the steer lock assembly 150 in a position relative to the wheel 58 that impedes the rotation of the wheel 58 about swivel axis S to assist a user in steering the patient transport apparatus 30 along the floor surface F. The braked state, as shown in FIG. 2C, refers to a positioning of the brake assembly 100 relative to its wheel 58 wherein a brake pad 102 of the brake assembly 100 is engaged with the outer end surface 63 of the wheel 58 so as to prevent the rotation of the wheel 58 about its rotational axis R. Conversely, the unbraked state, as shown in FIGS. 2A and 2B, refers to a positioning of the brake assembly 100 relative to its wheel 58 wherein the brake pad 102 of the brake assembly 100 is not engaged with the outer end surface 63 of the wheel 58, thereby allowing free rotation of the wheel 58 about its rotational axis R.

In the embodiments shown, the one or more caster assemblies 60 also includes an actuator 200 to change the mode of operation of the patient transport apparatus 30. More specifically, the actuator 200 is operable to place the steer lock assembly 150 in a non-steer locked state or a steer locked state and is also operable to place the brake assembly 100 in a braked stated or an unbraked state.

In certain embodiments, including the embodiments shown in the Figures provided herein, the actuator 200 is in the form of a foot pedal 210. The foot pedal 210 includes a body having a profile that defines adjacent first, second and third notched regions 220, 222, 224 that are shaped to be separately respectively engageable with the brake assembly 100 in either the braked state or the unbraked state, as will be described in further detail below. The body also includes an additional steer lock engaging region 226 distinct from the adjacent first, second and third notched regions 220, 222, 224 that is shaped to be engageable with the steer lock assembly 150 in the steer locked state. Still further, the foot pedal 210 includes an upper foot engagement region 228 and a lower foot engagement region 229, distinct from the adjacent first, second and third notched regions 220, 222, 224 and the steer lock engaging region 226, that are configured to be engaged by the foot of a caregiver to apply a force to the foot pedal 210.

The foot pedal 210 is mounted to the base frame 35, shown here as mounted to the base 34, via an axle pin 230 passing through an opening. The axle pin 230 is attached to the base frame 35 or base 34. The foot pedal 210 is arranged to rotate about a rotational axis R1 (in either a counterclockwise direction R1' or clockwise direction R1" as shown in FIGS. 2B and 2C) defined by the axle pin 230 upon force F3 being applied to the upper foot engagement region 228, or force F1 being applied to the lower foot engagement region 229, so as to move the respective one of the caster assemblies 60 between the neutral mode, the steer locked mode and the braked mode, as will be further explained below. The foot pedal 210 may optionally rotate relative to the axle pin 230 about rotational axis R1 via a foot pedal bearing (not shown).

The brake pad 102 has an engaging surface 104 shaped to engage the outer end surface 63 of the wheel 58 in the braked position (see FIG. 2C). The brake pad 102 is coupled to a bottom end 112 of a plunger 110, and more typically is secured to the bottom end 112 of the plunger 110 via a pin 129.

The plunger 110 includes a middle portion 114 extending between a bottom end 112 and a top end 116. The middle portion 114 of the plunger 110 is at least partially contained within the interior space 75 of the stem 74, while the top end 116 is positioned within a first cavity 37 defined within the base 34, the flange 71, or a combination of the flange 71 and the base 34 (see FIGS. 2A-2C).

The top end 116 include a shoulder region 118 and also includes an engaging outer surface 120 that is engageable with the foot pedal 210 to move the brake assembly 100 of the associated caster assembly 60 between the braked state and the unbraked state, as will be described further below.

The brake assembly 100 also includes a brake biasing device, here a ring shaped spring 130, positioned within the first cavity 37 that is engaged between the lower outer surface 119 of the shoulder region 118 and a top shelf surface 113 of the stem 74 extending transverse to the interior surface 74A. The spring 130 normally biases the plunger 110 such that the brake pad 102 is disengaged from the outer surface 63 of the wheel 58, corresponding to the unbraked state (see FIGS. 2A and 2B).

The engagement of the brake pad 102 to the outer end surface 63 of the wheel 58, and conversely the disengagement of the brake pad 102 from the outer end surface 63 of the wheel 58 is accomplished when the user applies force to one of the upper or lower foot engagement regions 228, 229 to rotate around the rotational axis R1 in a clockwise or counterclockwise direction so that a desired one of the first, second or third notched regions 220, 222, 224 is engaged with the engaging outer surface 120 of the plunger 110.

Specifically, as shown in FIG. 2C, when the user applies force F3 to move the foot pedal 210 (i.e., rotate the foot pedal 210 about the rotational axis R1 in the clockwise direction R1") such that the first notched region 220 is positioned adjacent to the engaging outer surface 120 of the plunger 110, a downward force F4 is applied from foot pedal 210 on the engaging outer surface 120 of the shoulder region 118 of the plunger 110. This force F4 moves the plunger 110 such that the lower outer surface 119 of the shoulder region 118 of the plunger 110 exerts compressive force on the annular spring 130 between the top shelf surface 113 of the stem 74 and the lower outer surface 119. The movement of the plunger 110 within the cavity 37 downward towards the wheel 58 also causes the movement of the coupled brake pad 102 downward to a position wherein it is engaged with the outer surface 63 of the wheel 58 and exerts a force F5 on the outer surface 63 (corresponding to the force F4), thereby preventing the wheel 58 from rotating freely about rotational axis R in a clockwise or counterclockwise direction upon force being applied to the patient transport device 30 to move the patient transport apparatus 30 along the floor surface F.

Conversely, referring to FIG. 2B, when the user applies force F1 to move the foot pedal 210 (i.e., rotate the foot pedal 210 about the rotational axis R1 in the counterclockwise direction R1') from the first notched region 220 to rotate the foot pedal such that the second notched region 222, or third notched region 224 is positioned adjacent to the engaging outer surface 120 of the plunger 110, the force F4 is relieved, and the biasing force of the annular spring 130 moves the plunger 110 upward within the cavity 37 such that the braked pad 102 is disengaged from the outer end surface 63 of the wheel 58, wherein the wheel 58 is free to rotate about rotational axis R in a clockwise or counterclockwise direction.

As best illustrated in FIGS. 2A-2C and 3, the steer lock assembly 150 comprises a lock receiver 83 that extends outwardly in a direction away from the swivel axis S and generally parallel to the floor surface F. In certain embodiments, such as shown in FIGS. 2A-2C, the lock receiver 83 may be a part of, or integrally formed with, the neck 76. Alternatively, the lock receiver 83 may be coupled to and extend outwardly away from an outer surface 77 of the neck 76. Regardless of whether the lock receivers 83 are integrally formed with the neck 76 or a separate structure coupled to the neck 76, the lock receivers 83 swivel about the swivel axis S in conjunction with the neck 76, fork 78 and wheel 58.

Each of the lock receivers 83 includes an inner surface 84 defining one or more openings 85, such as one or more notches. The openings 85 are respectively sized and shaped to receive a locking element, such as a steer lock pin 160 of the steer lock assembly 150 so as to prevent the rotation of the neck 76, fork 78 and wheel 58 about the swivel axis S, when the steer lock assembly 150 is in the steer locked mode (as shown and described below in conjunction with FIG. 2B).

The trailing position of the wheels 58, as is well understood by one of ordinary skill, refers to the positioning of the wheels 58 of the caster assemblies 60 such that the wheel planar surfaces WS of the side surfaces 65 are parallel to the longitudinal axis L and typically occurs when the patient transport apparatus 30 is being, or has been, pushed or pulled in a direction along the longitudinal axis L by a user for a sufficient distance wherein the caster assemblies 60 have rotated about the swivel axis S, with the wheels 58 offset from the swivel axis S in a position opposite the direction of force along the longitudinal axis L. Thus, for example, as shown in FIG. 1, the wheels 58 are positioned in a leading position relative to the head end of the patient transport apparatus 30, and in a trailing position relative to the foot end of the patient transport apparatus 30, which is generally indicative wherein the user has last applied force in a direction towards the foot end of the patient transport apparatus 30.

Figure 4A:
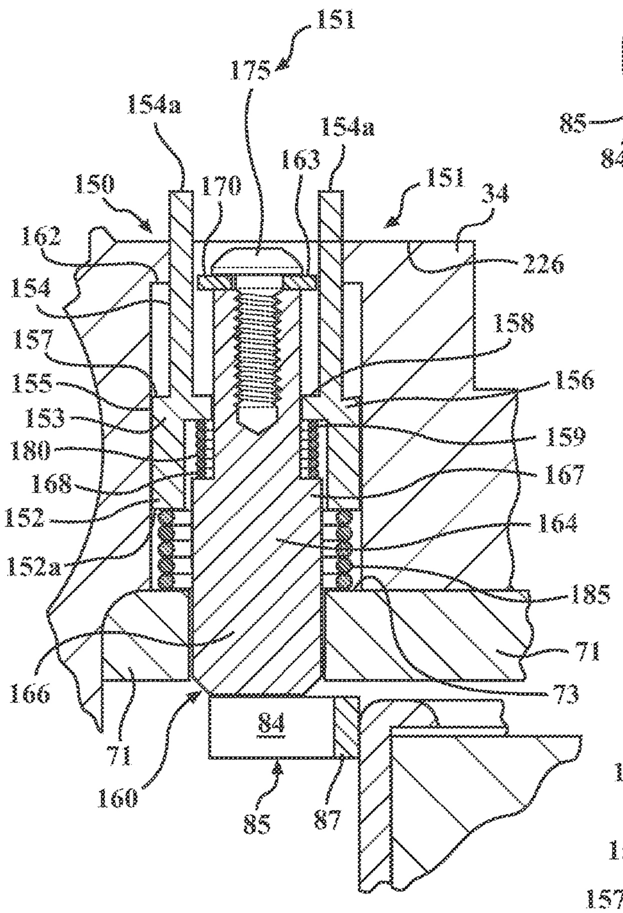
FIG. 4A is an illustration of the steer lock assembly with a steer lock pin partially engaged with the lock receiver.
Figure 4B:
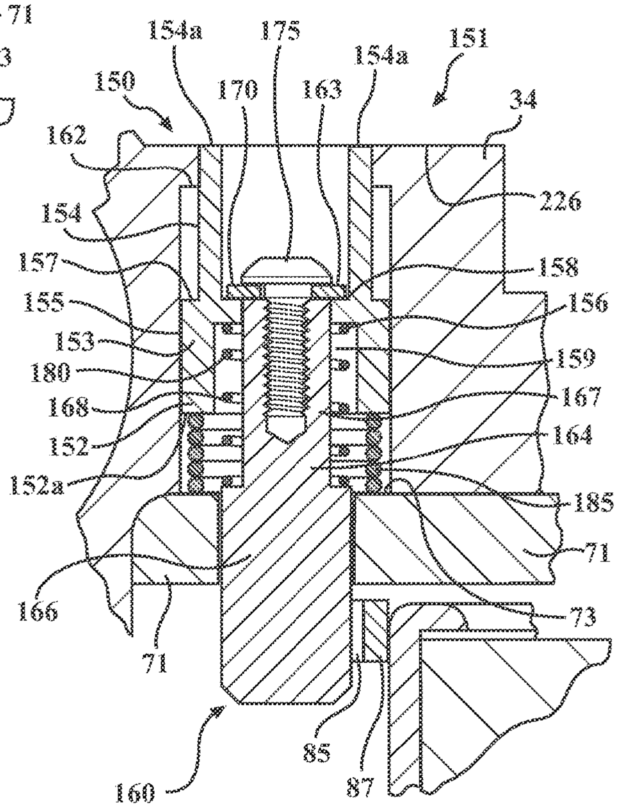
FIG. 4B is an illustration of the steer lock assembly with the steer lock pin fully engaged with the lock receiver.

As best shown in FIGS. 4A and 4B, the steer lock assembly 150 includes a plunger, such as hollow sleeve member 151. The hollow sleeve member 151 includes a lower portion 152, an upper portion 154, and a ledge portion 153 extending transverse to, and between, the lower portion 152 and the upper portion 154. The ledge portion 153 includes an outer ledge portion 155 and an inner ledge portion 156. The outer ledge portion 155 includes an upper exterior ledge surface 157. The inner ledge portion 156 includes an upper interior ledge surface 158 and an opposing lower interior ledge surface 159.

The upper portion 154 of the hollow sleeve member 151 includes a terminal upper surface 154*a* that is shaped to be engageable with the foot pedal 210 to position the steer lock assembly 150 in the steer locked state, as will be described further below.

The steer lock pin 160 has a middle pin portion 164 extending between an upper pin portion 162 and lower pin portion 166. The middle pin portion 164 includes a stepped region 167 having an upper step surface 168. A washer 170 is seated on an upper surface 163 of the upper pin portion 162.

The steer lock assembly 150 further comprises a fastening device, shown in FIGS. 2A-2C, 4A and 4B as a screw 175, that is secured to the upper pin portion 162 of the steer lock pin 160 such that the washer 170 is positioned between the head 177 of the screw 175 and the upper pin portion 162 of the steer lock pin 160. The washer 170 acts to limit movement of the steer lock pin 160 relative to the hollow sleeve member 151 by virtue of being sized larger than an opening in the inner ledge portion 156 through which the upper pin portion 162 moves. It also allows the hollow sleeve member 151 to withdraw the steer lock pin 160 from the opening 85 by virtue of being engaged by the inner ledge portion 156 when the hollow sleeve member 151 returns to the non-steer locked state as described below.

The steer lock assembly also includes two biasing devices, shown best in FIGS. 4A and 4B as a first steer lock spring 180 and a second steer lock spring 185, respectively, which may be compression springs or other suitable springs. The first steer lock spring 180 is positioned between the upper step surface 168 and the lower interior ledge surface 159, while the second steer lock spring 185 is positioned between an upper shelf surface 73 of the flange 71 and a lower portion surface 152*a* of the lower portion 152 of the hollow sleeve member 151.

When the caster assembly 60 is in the steer locked state, corresponding to the steer locked mode of the patient transport apparatus 30 as illustrated in FIGS. 2B and 4B, the steer lock pin 160 is axially aligned with one of the openings 85, or notches, of the lock receiver 83. This occurs when the wheel 58 of the associated caster assembly 60 is positioned in the leading or trailing position relative to the head end of the patient transport apparatus 30.

Figure 3:
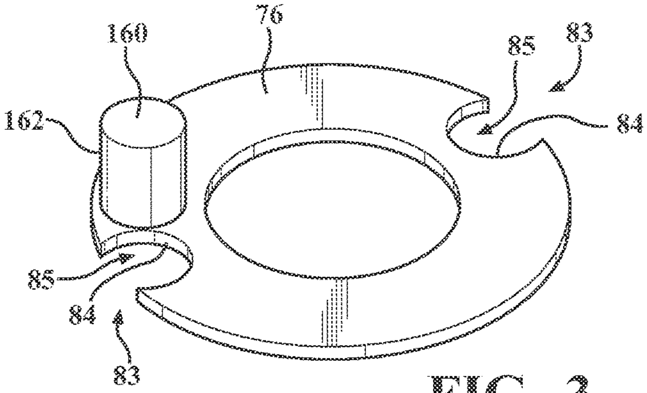
FIG. 3 is a perspective view of a lock receiver and a pin of the steer lock assembly.

To place the caster assembly 60 in the steer locked state, the steer lock engaging region 226 of the foot pedal 210 is brought into contact with the terminal upper surface 154*a* and a downward force F2 is applied on the hollow sleeve member 151 to move it towards the lock receiver 83. In so doing, referring to FIG. 4A, the lower portion surface 152*a* moves towards the upper shelf surface 73 of the flange 71, compressing the second steer lock spring 185. In addition, the movement of the hollow sleeve member 151 also moves the lower interior ledge surface 159 towards the upper step surface 168 of the middle pin portion 164, thereby compressing the first steer lock spring 180. The compression of the first steer lock spring 180 applies a downward force on the steer lock pin 160 sufficient to move the lower pin portion 166 toward the lock receiver 83. FIGS. 3 and 4A illustrate the situation is which the wheel 58 is not yet in a trailing orientation. In this case, the first steer lock spring 180 applies a biasing force against the steer lock pin 160 so that the steer lock pin 160 is biased against an upper surface of the lock receiver 83. However, the steer lock pin 160 is not yet axially aligned with the opening 85. Once the wheel 58 is oriented in the trailing orientation, then the steer lock pin 160 becomes axially aligned with the opening 85 and is biased into the opening 85, owing to the biasing force from the first steer lock spring 180, as shown in FIG. 4B. Once the steer lock pin 160 is in the opening, the lock receiver 83, the neck 76 and the wheel 58 are limited or prevented from swiveling about the swivel axis S.

Conversely, when the patient transport apparatus 30 is in the non-steer locked state, corresponding to either the neutral mode illustrated in FIG. 2A or the braked mode illustrated in FIG. 2C, the steer lock engaging region 226 of the foot pedal 210 is not in contact with the terminal upper surface 54 and is therefore not applying a downward force F2 on the hollow sleeve member 151 to move it towards the lock receiver 83. As such, the compression on the steer lock springs 180, 185 associated with the downward force F2 has been relieved and is absent, and the biasing force of the second steer lock spring 185 moves the hollow sleeve member 151 in a direction away from the lock receiver 83 (compare FIG. 2A to the positioning in FIGS. 2B and 4B). The biasing force of the second steer lock spring 185 and associated movement of the hollow sleeve member 151 also moves the steer lock pin 160 away from the locking receiver 83 owing to engagement of the washer 170 by the inner ledge portion 156. This movement is sufficient to move the lower pin portion 166 such that it is no longer contained or otherwise received within the opening 85 of the lock receiver 83, thereby allowing the lock receiver 83, the neck 76 and the wheel 58 to swivel about the swivel axis S when a user moves the patient transport apparatus 30.

When a user wishes to move the steer lock assembly 150 from the non-steer locked state to the steer locked state, or from the steer locked state to the non-steer locked state, the user either applies upward force F1 on the lower foot engagement region 229 (see FIG. 2B) to rotate the foot pedal 210 about the rotational axis R1 in a first rotational direction (shown for illustrative purposes as counterclockwise rotational direction R1' in FIG. 2B) or applies a downward force F3 on the upper foot engagement region 228 (see FIG. 2C) to rotate the foot pedal 210 about the rotational axis R1 in a second rotational direction (shown for illustrative purposes as clockwise rotational direction R1" in FIG. 2C), depending upon the initial positioning of the foot pedal 210. Additionally or alternatively, the user may apply a force on an opposing end of the foot pedal 210 to place the steer lock assembly 150 in the steer locked state. Any suitable actuation by the user may be employed. Notably, in the embodiment shown in the drawings, actuation is hands-free, which allows the user to maintain control of the patient transport apparatus 30 with their hands, such as by grasping the handle assemblies 57, while changing the mode the patient transport apparatus 30.

While the embodiments described above illustrate a caster assembly 60 that includes both a brake assembly 100 and a steer lock assembly 150, further embodiments may be included where a respective one of the caster assemblies 60 includes only a brake assembly 100, or a steer lock assembly 150. Still further, other embodiments may include a caster assembly 60 that includes neither a brake assembly 100 nor a steer lock assembly 150, with the caveat that at least one of the other caster assemblies 60 includes a steer lock assembly 150.

In certain embodiments, the patient transport apparatus 30 includes at least two of the caster assemblies 60 with a respective steer lock assembly 150. In certain of these embodiments, where two caster assemblies 60 include a respective steer lock assembly 150, the two caster assemblies are both located at the head end, or the foot end.

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A steer lock system for a patient transport apparatus, the steer lock system comprising:
- a support structure;
- a caster assembly coupled to the support structure to facilitate movement of the patient transport apparatus along a floor surface, the caster assembly including:
  - a wheel,
  - a wheel support coupled to the wheel to support the wheel for rotation about a rotational axis and for rotation about a swivel axis,
  - brake assembly including a brake plunger supported for movement along an axis, and a brake pad operatively attached to the brake plunger and arranged to selectively engage the wheel; and
  - a steer lock assembly movable relative to the wheel support and including a plunger spaced from the axis, a locking element coupled to the plunger and movable relative to the plunger, and a locking receiver; and
- a foot pedal mounted to the support structure and rotatable relative to the support structure between:
  - a steer locked state defined with at least a portion of the foot pedal disposed in engagement with the plunger to limit rotation of the wheel support about the swivel axis with the locking element engaged with the locking receiver,
  - a non-steer locked state defined with the foot pedal disposed out of engagement with the plunger to permit the wheel support to swivel about the swivel axis with locking element disengaged from the locking receiver, and
  - a braked state defined with the foot pedal disposed out of engagement with the plunger and abutting the brake plunger to arrange the brake pad in engagement with the wheel to prevent the wheel from rotating about the rotational axis.

2. The steer lock system of claim 1, wherein the foot pedal is configured to move the steer lock assembly to the steer locked state from the non-steer locked state by applying a force on the plunger.

3. The steer lock system of claim 1, wherein the locking element is further defined as a steer lock pin coupled to the plunger and movable relative to the plunger.

4. The steer lock system of claim 3, wherein the locking receiver defines an opening to receive the steer lock pin in response to a force applied from the foot pedal engaging the plunger when the opening is axially aligned with the steer lock pin.

5. The steer lock system of claim 4, further including a first biasing device to bias the steer lock pin toward the opening in response to the force applied to the plunger, and a second biasing device to withdraw the steer lock pin from the opening in response to removal of the force applied to the plunger.

6. The steer lock system of claim 5, wherein the first biasing device is positioned between the plunger and the locking element, and the second biasing device is positioned between the plunger and the support structure.

7. The steer lock system of claim 5, wherein the foot pedal is operable to compress the first biasing device between the plunger and the steer lock pin when the opening is misaligned with the steer lock pin such that a biasing force continuously biases the steer lock pin against an upper surface of the locking receiver until the opening is axially aligned with the steer lock pin.

8. The steer lock system of claim 5, wherein the steer lock pin includes a stepped region having an upper step surface; and
- wherein the plunger includes a lower portion having a lower portion surface, with the second biasing device positioned between the lower portion surface and the support structure.

9. The steer lock system of claim 8, wherein the plunger includes an upper portion having a terminal end surface arranged for engagement with the foot pedal in the steer locked state.

10. The steer lock system of claim 9, wherein the plunger includes a ledge portion between the lower portion and the upper portion and extending transverse to the lower portion and upper portion.

11. The steer lock system of claim 10, wherein the ledge portion includes:
- an outer ledge portion, and
- an inner ledge portion having an upper interior ledge surface and an opposing lower interior ledge surface, with the first biasing device being positioned between the lower interior ledge surface and the upper step surface.

12. The steer lock system of claim 1, wherein the foot pedal is operatively coupled to the brake assembly to move the brake assembly between:
- an unbraked state permitting the wheel to rotate about the rotational axis to facilitate movement of the support structure along the floor surface, and
- the braked state preventing the wheel from rotating about the rotational axis.

13. The steer lock system of claim 12, wherein the brake pad of the brake assembly is configured to disengage from the wheel in the unbraked state.

14. The steer lock system of claim 1, further including a first biasing device to bias the locking element toward the locking receiver in response to a force applied to the plunger from the foot pedal.

15. The steer lock system of claim 14, further including a second biasing device to withdraw the locking element from the locking receiver in response to removal of the force applied to the plunger.

16. The steer lock system of claim 15, wherein the first biasing device is positioned between the plunger and the locking element.

17. The steer lock system of claim 16, wherein the second biasing device is positioned between the plunger and the support structure.

18. The steer lock system of claim 1, wherein the plunger of the steer lock assembly is supported for movement in a direction arranged substantially parallel to the axis.

19. A steer lock system for a patient transport apparatus, the steer lock system comprising:

a support structure;

a caster assembly coupled to the support structure to facilitate movement of the patient transport apparatus along a floor surface, the caster assembly including:

a wheel, a wheel support coupled to the wheel to support the wheel for rotation about a rotational axis and for rotation about a swivel axis, a steer lock assembly movable relative to the wheel support and including a plunger, a locking element coupled to the plunger and movable relative to the plunger, and a locking receiver;

a foot pedal mounted to the support structure and rotatable relative to the support structure between:

a steer locked state defined with at least a portion of the foot pedal disposed in engagement with the plunger to limit rotation of the wheel support about the swivel axis with the locking element engaged with the locking receiver, and a non-steer locked state defined with the foot pedal disposed out of engagement with the plunger to permit the wheel support to swivel about the swivel axis with locking element disengaged from the locking receiver; and a biasing device to withdraw the locking element from the locking receiver in response to removal of a force applied to the plunger from the foot pedal.

* * * * *